United States Patent
Dong et al.

[19]

[11] Patent Number: 5,950,750
[45] Date of Patent: Sep. 14, 1999

[54] DRIVE ARRANGEMENT FOR A MOTOR VEHICLE

[75] Inventors: Leong C. Dong, Farmington Hills; Nicholas Rosenthal, West Bloomfield; Mark W. Junis, Rochester Hills; Thomas R. Carbone, Grosse Pointe, all of Mich.

[73] Assignee: Chrysler Corporation, Auburn Hills, Mich.

[21] Appl. No.: 08/931,036

[22] Filed: Sep. 16, 1997

[51] Int. Cl.[6] .................................................. B62D 61/10
[52] U.S. Cl. ..................................... 180/24.09; 180/24.08; 180/24.1; 180/24.11; 180/247; 180/374
[58] Field of Search .................................. 180/22, 24.04, 180/24.08, 24.09, 24.1, 24.11, 24.12, 247, 374, 375, 376, 377

[56] References Cited

U.S. PATENT DOCUMENTS

| | | | |
|---|---|---|---|
| 2,158,320 | 5/1939 | Bock | 180/24.08 |
| 2,267,562 | 12/1941 | Higgins | 180/24.09 |
| 3,083,782 | 4/1963 | Ivaldi | 180/24.04 |
| 3,773,130 | 11/1973 | Mueller | 180/24.09 |
| 4,050,534 | 9/1977 | Nelson et al. | 180/24.09 |
| 4,407,387 | 10/1983 | Lindbert | 180/24.1 |
| 4,966,244 | 10/1990 | Somerton-Rayner | 180/24.09 |
| 5,363,938 | 11/1994 | Wilson et al. | 180/247 |
| 5,400,866 | 3/1995 | Wilson et al. | 180/247 |
| 5,411,110 | 5/1995 | Wilson et al. | 180/247 |

OTHER PUBLICATIONS

"The Heavy Duty, Over–the–Shoulder Model 70 HD/OS", Dana Corporation, Published, no date indicated.
*The Motor Vehicle*, Chapter 36. "Six–Wheel Vehicles", Published—date not known.

*Primary Examiner*—Lanna Mai
*Assistant Examiner*—William R. Zimmerli
*Attorney, Agent, or Firm*—Kenneth H. Maclean

[57] ABSTRACT

A drive train arrangement for a motor vehicle that includes a pair of front and rear transfer cases each having a single-input shaft and dual-output shafts for providing drive to a front axle and to a pair of rear axles located in tandem and in which the arrangement is such that the rear transfer case normally provides a full-time four-wheel drive through the tandem axles and the front transfer case is selectively activated to direct power to the front axle so as to provide a full-time six-wheel drive for the vehicle.

8 Claims, 6 Drawing Sheets

DRIVE ARRANGEMENT FOR A MOTOR VEHICLE

This invention concerns motor vehicles and more particularly relates to a drive arrangement which includes a pair of transfer cases for delivering drive to a front axle and to a pair of rear axles located in tandem.

BACKGROUND OF THE INVENTION

A typical six-wheel drive arrangement for a motor vehicle includes an axle having steerable wheels at the front end of the vehicle and tandem axles at the rear of the vehicle. There are different types of drive arrangements that can be used for providing drive to the tandem axles and one such arrangement that has been applied to large Class 8 semi-tractors has a torque splitter or inter-axle differential incorporated into the front axle of the tandem axle pair. The inter-axle differential is a bevel gear type that provides a 50/50 torque split between the two rear axles. Torque from the propeller shaft drives the carrier member of the inter-axle differential and outputs are through the side gears to the two rear axles. More specifically, drive from the inter-axle differential is directed to the forward axle through helical gears and to the rear axle gearing through a bevel gear. The tandem axle drive arrangement has lockout capabilities provided by the use of a sliding collar that connects the input shaft to one of the side gears of the inter-axle differential so as to force both axle pinions to rotate at the same speed. Each of the tandem axles also has a bevel gear differential so side to side wheel rotation differentiation can occur in either axle. In addition, each of the axles can be provided with a planetary gear reducer located adjacent the bevel gear differential. The planetary gear reducer can be selectively operated and used or bypassed so as to give the vehicle the capability to use a different drive ratio for starting or for low speed operation.

One problem with a tandem axle drive arrangement of the type described above is that by integrating the inter-axle differential with the usual differential of the forward axle, a large bulky unit is provided that is difficult and expensive to service and maintain. Another problem with this type of drive arrangement is that it is difficult to upgrade the inter-axle differential unit without extensive redesign of the complete forward axle for future improvements such as greater torque capacity, on demand or different torque split, multiple speeds, and use of electronics.

SUMMARY OF THE INVENTION

Accordingly, one object of the present invention is to provide a new and improved tandem axle drive arrangement that is simple to maintain, easily upgradable for new innovations, and relatively inexpensive to manufacture and which is combined with a front axle drive arrangement so as to provide six-wheel drive for a vehicle.

Another object of the present invention is to provide a new and improved six-wheel drive arrangement for a motor vehicle that utilizes a pair of transfer cases for providing drive to the front axle and to a pair of rear axles arranged in tandem and in which the drive shaft between the transfer cases is longitudinally aligned with the output shaft providing drive to the forward axle of the tandem axles.

A further object of the present invention is to provide a new and improved drive arrangement for a six-wheel drive motor vehicle in which a pair of separate single-input dual-output transfer cases are utilized for supplying drive to the front axle and the rear tandem axles of the vehicle.

A still further object of the present invention is to provide a new and improved six-wheel drive vehicle having rear tandem axles provided with a drive arrangement which includes a separate transfer case sealingly joined to the differential housing of the forward axle and having one output shaft of the transfer case directly connected to the pinion gear of the forward axle's differential and has the other output shaft rotatably supported on the forward axle's differential housing and extending rearwardly for connection with differential gearing of the rear axle that is laterally offset relative to the differential gearing of the forward axle.

The present invention meets the above objects by providing a vehicle having a front axle and a rear axle and an intermediate axle located in tandem. An engine and a transmission combination is supported on the frame for providing drive to the axles, and each of the axles is provided with a differential housing containing differential gearing through which drive is directed to a pair of wheels rotatably mounted at the opposed ends of each of the axles. A drive train is operatively connected between the transmission and each of the axles, and the drive train includes a first transfer case receiving drive from the transmission and having first and second output shafts. A second transfer case is secured to the differential housing of the intermediate axle and has an input shaft and third and fourth output shafts. A first drive shaft is connected between the first output shaft and the differential gearing of the front axle while a second drive shaft is connected between the second output shaft and the input shaft of the second transfer case. A third drive shaft is longitudinally aligned with the second drive shaft and serves to connect the third output shaft to the differential gearing of the intermediate axle. In addition, a fourth drive shaft is offset from the third drive shaft and serves to connect the fourth output shaft to the differential gearing of the rear axle. The arrangement is such that the tandem axles normally provide a full-time four-wheel rear drive and the first transfer case is selectively and electrically activated to direct power to the front axle so as to thereby provide a full-time six-wheel drive vehicle. Furthermore, both the first and second transfer cases are electrically activated to provide locked differentials within the transfer cases so as to thereby provide part-time six-wheel drive for improved traction. Additionally, the first transfer case incorporates a low range planetary gear reduction to provide a lower speed part-time six-wheel drive for off-highway operation of the vehicle.

BRIEF DESCRIPTION OF THE DRAWINGS

Other objects, advantages, and features of the present invention will become apparent to those skilled in the art from the following detailed description when taken with the drawings in which.

DETAILED DESCRIPTION OF THE INVENTION

Figure 1:
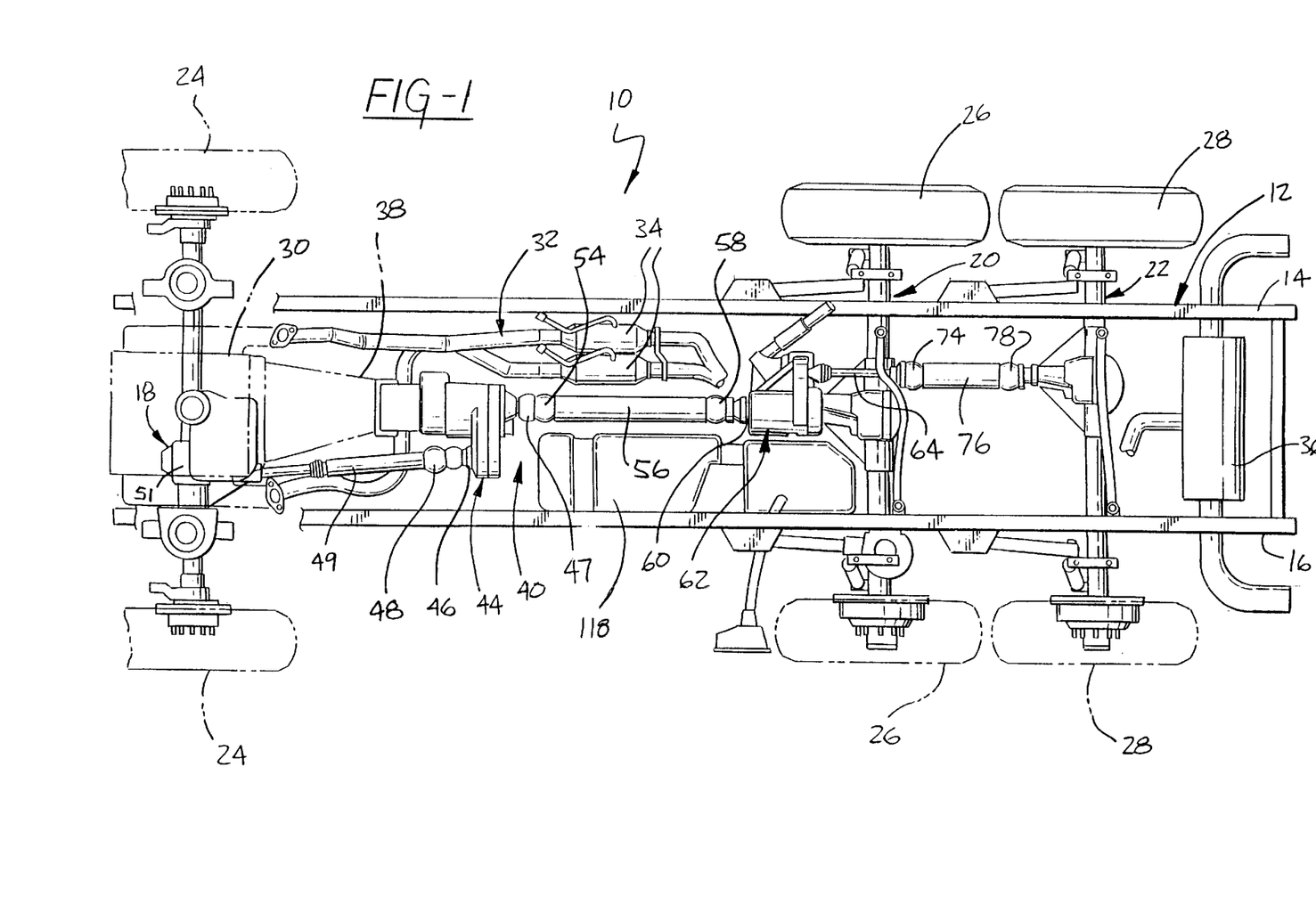
FIG. 1 is a plan view of a vehicle chassis having a front axle and a pair of rear axles located in tandem combined with a drive train arrangement in accordance with the present invention that is capable of providing six-wheel drive to the vehicle.
Figure 2:
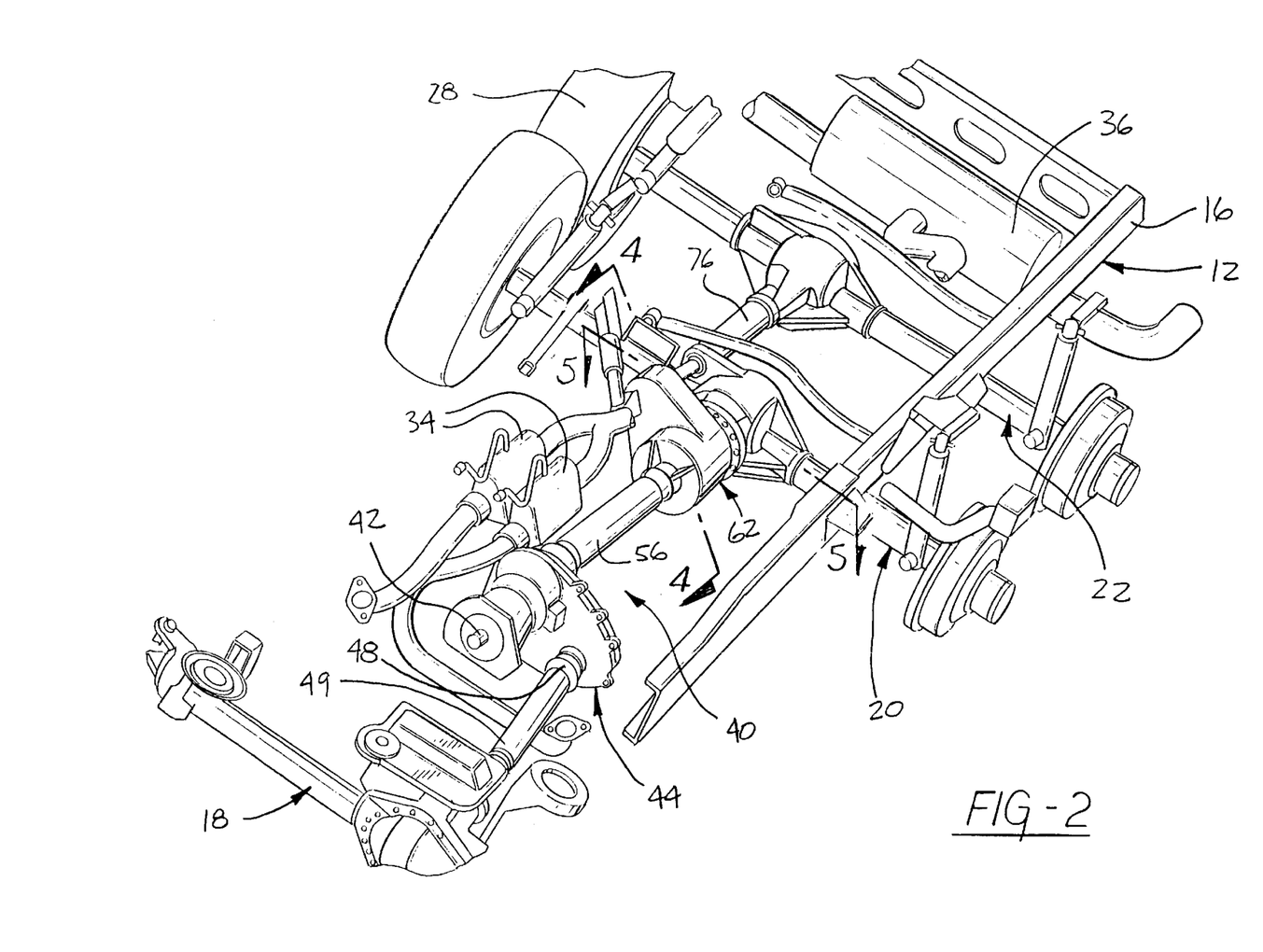
FIG. 2 is a perspective view of the rear part of the drive train arrangement that provides drive to the rear tandem axles.

Referring to the drawings and more particularly FIGS. 1 and 2 thereof, the chassis 10 of a six-wheel drive vehicle is shown that includes a frame 12 composed of a pair of laterally spaced side rails 14 and 16 supported by a front axle 18 and a pair of rear axles 20 and 22 arranged in tandem. The opposed ends of the front axle 18 is provided with a pair of steerable wheels 24 the supporting axle of each of which is connected to the vehicle frame 12 through a leading arm suspension system (not shown). Each of the rear axles 20 and 22 similarly has its opposed ends provided with wheels 26 and 28, respectively, and is connected to its associated side rail of the frame 12 by a trailing arm suspension system (not shown).

The front end of the vehicle frame 12 supports an internal combustion engine 30, the exhaust manifold of which communicates with an exhaust system 32 that has a pair of catalytic converters 34 connected with a muffler 36 mounted to the vehicle frame 12 behind the rear axles 20 and 22. The engine 30 is combined with a transmission 38 which, in turn, is drivingly connected to a drive train arrangement made in accordance with the present invention and generally indicated by the reference numeral 40. As will be more apparent as the detailed description of the invention proceeds, the drive train arrangement 40 is adapted to continuously provide drive to the two rear axles 20 and 22 and selectively provide drive to the front axle 18 so that the vehicle can be operated as a four-wheel drive vehicle or a six-wheel drive vehicle.

More specifically and as seen in FIG. 2, the output shaft (not shown) of the transmission 38 provides drive to an input shaft 42 of a two-speed transfer case 44 made by New Venture Gear of Syracuse, N.Y. and identified as Model NVG 244HD. The transfer case 44 is provided with a pair of output shafts 46 and 47, the former of which is connected through a universal joint 48 to a drive shaft 49 that extends forwardly for connection through a universal joint 50 with the differential gearing 51 (seen in FIG. 6) incorporated in the front axle 18. The gearing arrangement within the transfer case 44 provides a direct connection to the output shaft 47 and, through an internally housed electrically operated clutch shift system (not shown), and a planetary differential system 52 (FIG. 6) provides for selective connection between the input shaft 42 and the output shaft 46 for directing drive through the drive shaft 49 to the front axle 18.

Figure 6:
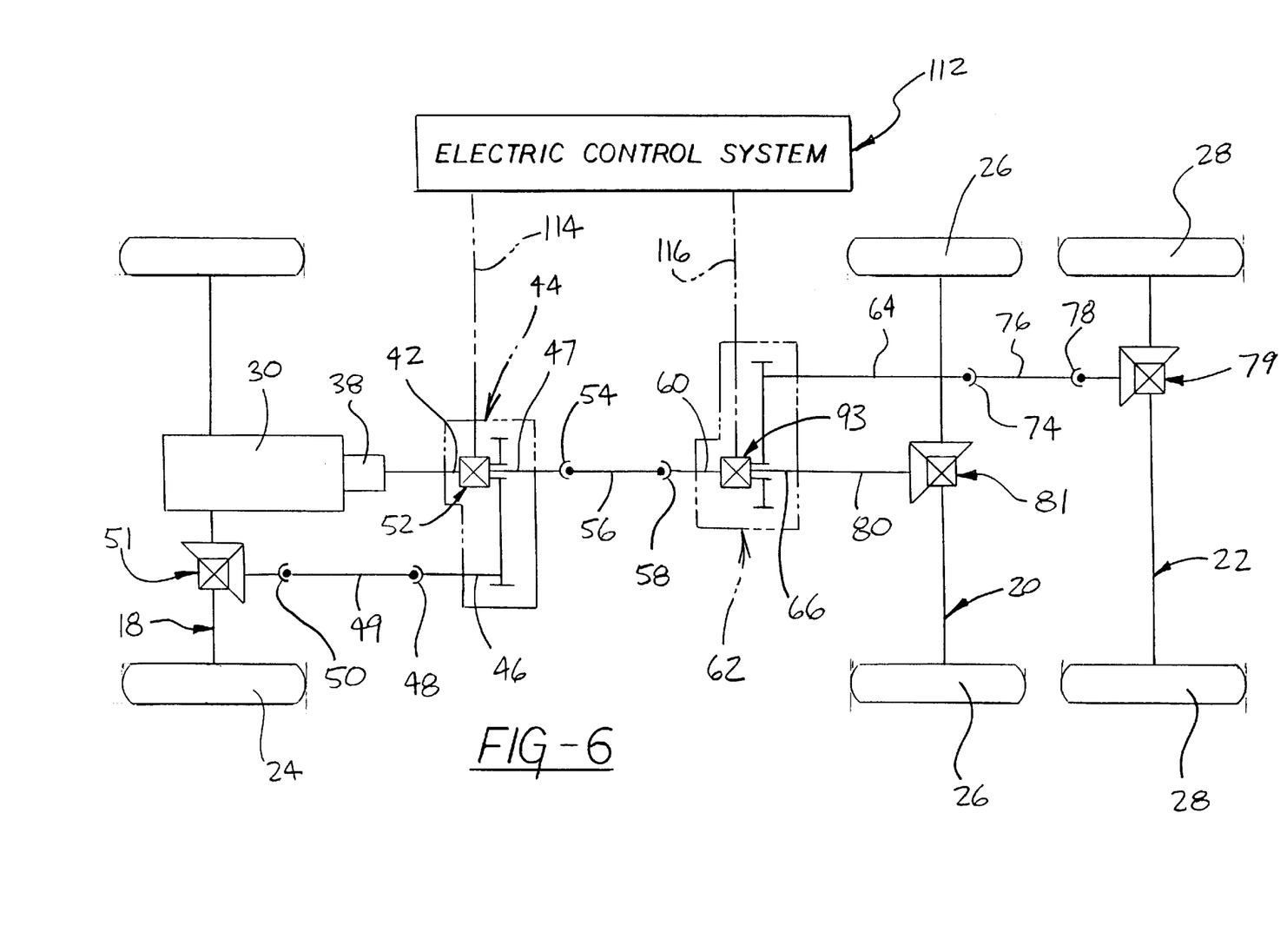
FIG. 6 is a schematic diagram showing the drive train arrangement of FIGS. 1–5 combined with a control system for selectively activating the two transfer cases of the drive train arrangement for providing four-wheel drive and six-wheel drive.

The other output shaft 47 of the transfer case 44 is connected through a universal joint 54 to the front end of a drive shaft 56. The rear end of the drive shaft 56 extends rearwardly and is connected through a universal joint 58 to an input shaft 60 of a second transfer case 62. The transfer case 62 is made by the Spicer Axle Division of Dana Corporation located in Fort Wayne, Ind. The transfer case 62 is identified by the Spicer Axle Division as Model TC-44, and includes a pair of output shafts 64 and 66 as best seen in FIGS. 4 and 6.

Figure 3:
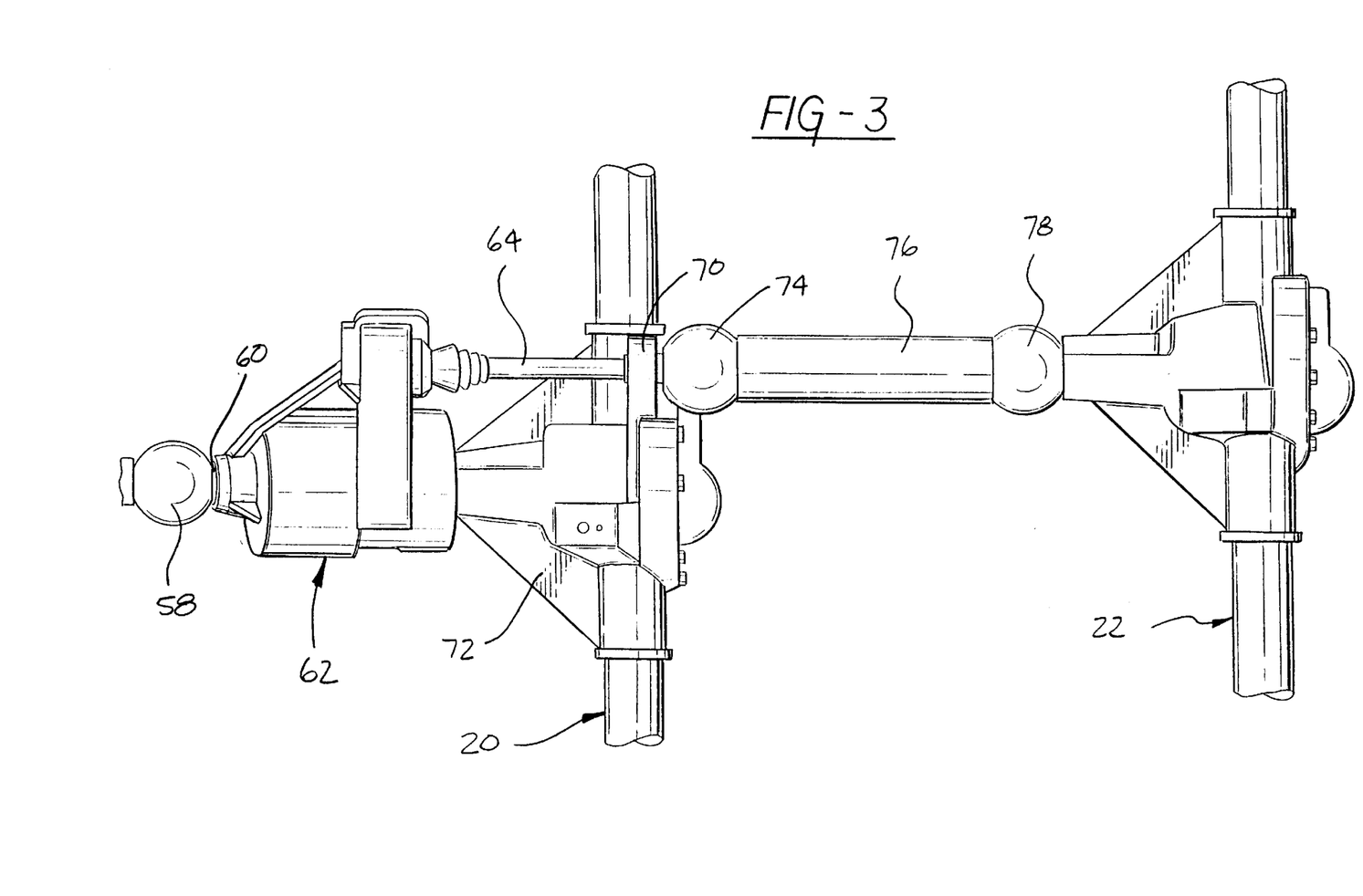
FIG. 3 is an enlarged plan view of the rear part of the drive arrangement seen in FIG. 2 with various parts removed so as to more clearly show the drive train arrangement.
Figure 4:
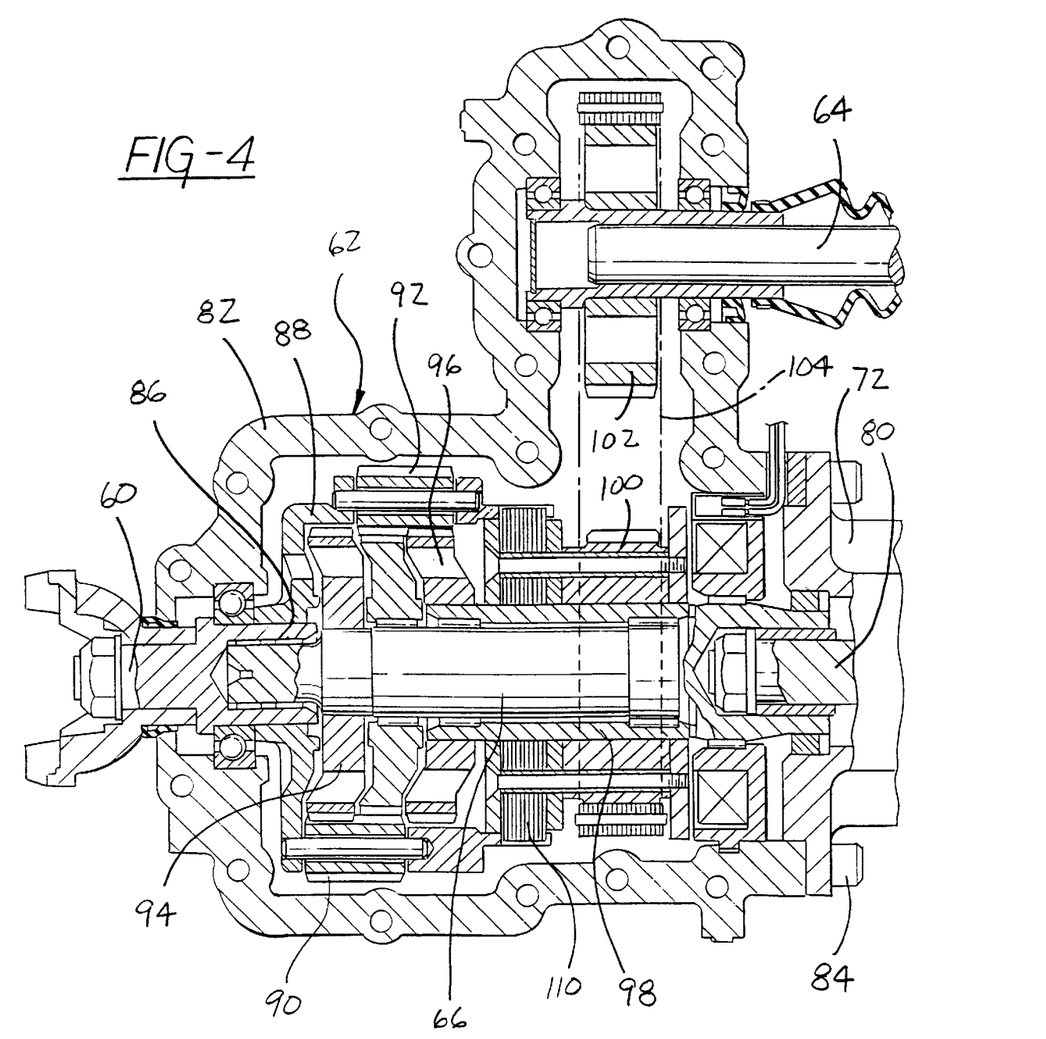
FIG. 4 is an enlarged sectional view taken on line 4—4 of FIG. 2 and shows the gearing located within the transfer case which provides drive to the rear tandem axles.
Figure 5:
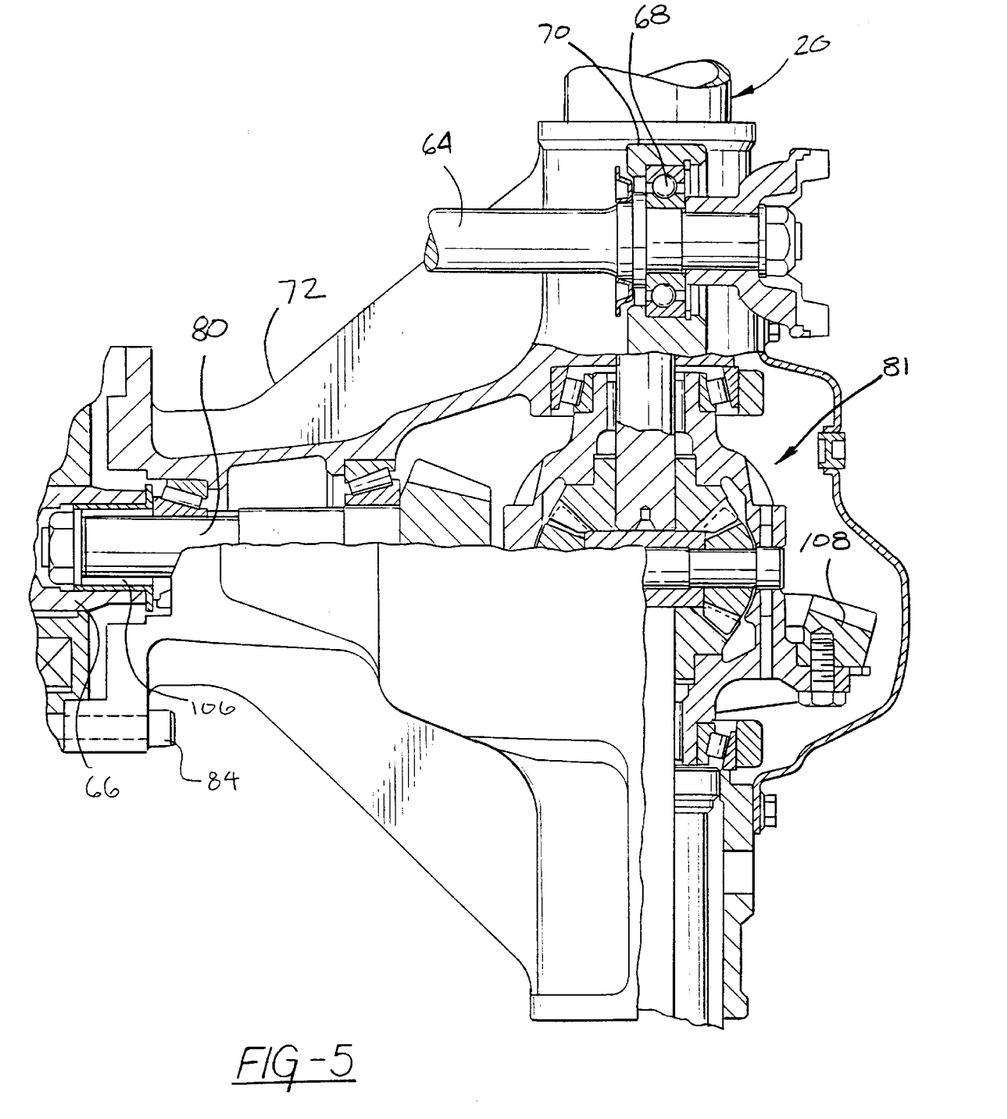
FIG. 5 is an enlarged sectional view taken on line 5—5 of FIG. 2 and shows the differential gearing incorporated in the front axle of the rear tandem axles.

As seen in FIGS. 3 and 5, the output shaft 64 of the transfer case 62 has its rear end rotatably supported by a bearing 68 which, in turn, is supported in a bearing support 70 rigidly formed with the upper part of a differential housing 72 of the axle 20. The output shaft 64 is connected through a universal joint 74 to the front end of a drive shaft 76 the rear end of which is drivingly connected through a universal joint 78 to the input shaft of the differential gearing 79 (shown in FIG. 6) incorporated with the rear axle 22. As seen in FIGS. 4 and 5, the other output shaft 66 of the transfer case 62 is drivingly connected to the input shaft 80 of the differential gearing 81 of the rear axle 20 which is positioned intermediate or between the front axle 18 and the rear axle 22. It will be noted that in plan view in FIGS. 1 and 6, the center longitudinal axis of the input shaft 80 is axially aligned with the longitudinal center axis of each of the drive shaft 56 (located between transfer cases 44 and 62), the input shaft 60, and the output shaft 66 of the transfer case 62.

FIGS. 4 and 5 show in detail the interconnection between the gearing of the transfer case 62 and the differential gearing 81 of the intermediate or rear axle 20. In this regard, it will be noted that the housing 82 of the transfer case 62 is bolted by a plurality of circumferentially spaced bolts (one of which only is shown and indicated by reference numeral 84) to the differential housing 72 of the axle 20 so that one of the units can be separated from the other very readily in the event that either requires maintenance, repair, or upgrade. In addition, seal means is provided between the two units so that lubricating oil in the differential housing 72 of the axle 20 and the lubricating oil in the transfer case 62 are separated from each other.

As best seen in FIG. 4, the input shaft 60 of the transfer case 62 is connected by a spline connection 86 to a carrier member 88. The carrier member 88 rotatably supports a plurality of circumferentially spaced side-by-side planet gears 90 and 92 which form a part of a planetary differential system generally indicated by the reference numeral 93 as seen in FIG. 6. One transversely aligned set of planet gears 90 supported by the carrier member 88 mesh with a spur gear 94 fixed with the output shaft 66. The other set of transversely aligned planet gears 92 rotatably carried by the carrier member 88 mesh with a spur gear 96 fixed to the front end of a sleeve shaft 98 which is concentric with and supported for rotation by the output shaft 66. The sleeve shaft 98 has its rear end fixed with a gear 100 that is drivingly connected to a gear 102 rigid with the front end of the output shaft 64. An endless chain 104 is entrained about the gears 100 and 102 and serves as a drive transmitting means between these two gears. The gear 102 is fixed with the front end of the output shaft 64 and the latter has its rear end connected to the laterally offset differential gearing of the axle 22 as hereinbefore explained. As seen in FIG. 5, the output shaft 66 of the transfer case 62 is fixed through a spline connection 106 with the bevel gear input shaft 80 of the differential gearing 81 which forms a part of the rear axle 20. As is conventional, the bevel gear of the input shaft 80 meshes with the crown gear 108 of the differential gearing of the rear axle 20. At this juncture, it will be noted that the differential gearing 51, 81, and 79 incorporated in the axles 18, 20 and 22, respectively, are similar in construction and conventional in design and operation.

The planetary differential system 93 of the transfer case 62 serves to split the drive torque 50/50 between the output shafts 64 and 66 to provide full-time four-wheel drive to the vehicle. In addition, clutch plates 110 are incorporated in the transfer case that are electro-mechanically operated for providing a lock-up through the carrier member 88 of the planet gears 90 and 92 with the gear 100 so that part-time drive can be provided, if desired, when the vehicle is operated off-highway.

During dry-weather on-highway operation of the vehicle, the drive train arrangement 40 will normally be in a four-wheel drive mode. This is accomplished through a rotary switch (not shown) located in the vehicle cab. The switch forms a part of an electrical control system 112 shown in block form in FIG. 6 that is electrically connected by lines 114 and 116 to electric actuators (not shown) which serve to activate the clutch systems within transfer cases 44 and 62. By rotating the switch to a "4 REAR FULL-TIME" position, the transfer case 44 will be electrically conditioned through its clutch system so that only the output shaft 47 is activated and drive is directed through the drive shaft 56 to the input shaft 60 of the second transfer case 62. At this time, the control system 112 causes the clutch plates 110 of the transfer case 62 to be located in the released or disengaged position so that full-time four-wheel drive is realized with the drive torque being split 50/50 to the differential gearing 79 and 81 of the two rear axles 20 and 22.

If the vehicle operator requires six-wheel drive, the switch is rotated to a position indicated as "6WD FULL-TIME" position. This causes the control system 112 to condition the planetary differential 93 of transfer case 62 so as to continue to provide drive to the tandem axles 20 and 22 and to electrically condition the planetary differential 52 of the transfer case 44 to also provide drive to the differential gearing 51 of the front axle through the output shaft 46 and the drive shaft 49.

During off-highway operation, the switch will usually be rotated to a position indicated as "6HI PART-TIME". At this time the control system 112 will cause both of the planetary differential systems 52 and 93 of the transfer cases 44 and 62 to be placed in a "lock up" mode so as to have part-time six-wheel drive for improved traction. The switch can also be rotated to a "6LO" position at which time the control system 112 causes the planetary differential 52 of the transfer case 44 to be conditioned for a low range to provide a lower speed part-time six-wheel drive for off-highway operation of the vehicle.

In addition, the switch has a neutral position indicated by the letter "N". In this position of the switch and when the transmission 38 is placed in the neutral position, all driving axles are disengaged so that the vehicle can be towed.

It will be noted that although only one electrical line is shown leading from the control system 112 to each of the transfer cases 44 and 62, it will be understood by those skilled in the art to which the present invention pertains that depending upon the number of electro-mechanical clutch systems provided in each of the transfer cases for achieving the different drives described above, a suitable number of electric conductors would be provided in each electrical line in order to realize the desired result.

It should also be mentioned that one further advantage in having the differential gearing 81 of the axle 20 centrally located between the wheels 26 and using two transfer cases combined as described above is that sufficient space is provided between the side rails 14 and 16 of the frame 12 to have a fuel tank 118 positioned to one side of the main drive shaft 56. Also, one can have the catalytic converters 34 of the exhaust system located at the other side of the drive shaft 56 along the side rail 14.

Various changes and modifications can be made in the above described drive train arrangement without departing from the spirit of the invention. Accordingly, such changes and modifications are contemplated by the inventors and they do not wish to be limited except by the scope of the appended claims.

The embodiments of the invention in which an exclusive property or privilege is claimed are defined as follows:

1. In a vehicle having a front axle, a rear axle and an intermediate axle located between said front and rear axles with each of said axles being connected to the vehicle frame through a suspension system, an engine and transmission supported on said frame for providing drive to said axles, each of said axles including a differential housing containing differential gearing through which drive is directed to a pair of wheels rotatably mounted at the opposed ends of said each of said axles, a drive train operatively connected between said transmission and said each of said axles, said drive train including a first transfer case receiving drive from said transmission and having a first output shaft and second output shaft which is offset to one side of the longitudinal center axis of said vehicle, a second transfer case secured to said differential housing of said intermediate axle and having an input shaft, said second transfer case having a third output shaft and a fourth output shaft which is offset to the other side of said longitudinal center axis, a first drive shaft connected between said second output shaft and the differential gearing of said front axle, a second drive shaft aligned along said longitudinal center axis and connected between said first output shaft and said input shaft of said second transfer case, a third drive shaft longitudinally aligned with said second drive shaft and serving to connect said third output shaft to said differential gearing of said intermediate axle, a fourth drive shaft serving to connect said fourth output shaft to the differential gearing of said rear axle, said differential housing of said intermediate axle being located along said longitudinal center axis of said vehicle, and control means for normally having said second output shaft connected only to said first drive shaft so that said intermediate axle and said rear axle serve to provide said vehicle with full-time four-wheel drive, said control means serving to selectively activate said first transfer case to interconnect said first and second output shafts to thereby provide drive to the differential of said front axle so that said vehicle has full-time six-wheel drive.

2. The vehicle of claim 1 wherein an intermediate portion of said fourth output shaft of said second transfer case is supported for rotation in a bearing housing secured to said intermediate axle.

3. The vehicle of claim 2 wherein said bearing housing is located above said intermediate axle adjacent the differential housing thereof.

4. The vehicle of claim 1 wherein said differential housing of said front axle is offset to one side of said longitudinal center axis and said differential housing of said rear axle is offset to the other side of said longitudinal center axis.

5. The vehicle of claim 1 wherein a fuel tank is supported by said frame and is positioned along side of said second shaft and said second transfer case.

6. The vehicle of claim 1 wherein said first transfer case and said second transfer case each have a lock out mode to provide part-time six-wheel drive for off-highway operation.

7. The vehicle of claim 1 wherein said first transfer case provides two speed operation.

8. In a vehicle having a front axle, a rear axle and an intermediate axle located between said front and rear axles with each of said axles being connected to the vehicle frame through a suspension system, an engine and transmission supported on said frame for providing drive to said axles, each of said axles including a differential housing containing differential gearing through which drive is directed to a pair of wheels rotatably mounted at the opposed ends of said each of said axles, a drive train operatively connected between said transmission and said each of said axles, said drive train including a first transfer case having a first planetary differential receiving drive from said transmission and having a first output shaft and a second output shaft which is offset to one side of the longitudinal center axis of said vehicle, a second transfer case secured to said differential housing of said intermediate axle and having an input shaft connected to a second planetary differential, said second transfer case having a third output shaft and a fourth output shaft drivingly connected to said second planetary differential with said fourth output shaft being offset to the other side of said longitudinal center axis, a first drive shaft connected between said second output shaft and the differential gearing of said front axle, a second drive shaft aligned along said longitudinal center axis and connected between said first output shaft and said input shaft of said second transfer case, a third drive shaft longitudinally aligned with said second drive shaft and serving to connect said third output shaft to said differential gearing of said intermediate axle, a fourth drive shaft serving to connect said fourth output shaft to the differential gearing of said rear axle, said differential housing of said intermediate axle being located along said longitudinal center axis of said vehicle, and control means for normally having said first output shaft connected only to said second drive shaft so that said intermediate axle and said rear axle serve to provide said vehicle with full-time four-wheel drive, said control means serving to selectively and electrically activate said first planetary differential of said first transfer case to interconnect said first and second output shafts to thereby provide drive to the differential gearing of said front axle so that said vehicle has full-time six-wheel drive.

* * * * *